(12) United States Patent
Thomas et al.

(10) Patent No.: US 6,323,389 B1
(45) Date of Patent: Nov. 27, 2001

(54) HIGH PERFORMANCE ELASTIC COMPOSITE MATERIALS MADE FROM HIGH MOLECULAR WEIGHT THERMOPLASTIC TRIBLOCK ELASTOMERS

(75) Inventors: Oomman P. Thomas, Alpharetta; James R. Fitts, Jr., Gainesville; Richard M. Shane, Lilburn; Donald V. Willitts, Powder Springs, all of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/165,909

(22) Filed: Oct. 2, 1998

Related U.S. Application Data (60) Provisional application No. 60/064,554, filed on Oct. 3, 1997.

(51) Int. Cl.$^7$ ..................................................... A61F 13/15
(52) U.S. Cl. .................... 604/370; 604/385.24; 604/373; 604/385.27
(58) Field of Search ............................. 604/385.01, 370, 604/385.24, 385.27, 373

(56) References Cited

U.S. PATENT DOCUMENTS

| | | | |
|---|---|---|---|
| 4,100,324 | * 7/1978 | Anderson et al. | 428/288 |
| 4,107,364 | 8/1978 | Sisson | 428/196 |
| 4,209,563 | * 6/1980 | Sisson | 428/288 |
| 4,515,854 | 5/1985 | Kogame et al. | 428/288 |
| 4,543,099 | * 9/1985 | Bunnelle et al. | 604/385 |
| 4,663,220 | 5/1987 | Wisneski et al. | 428/221 |
| 4,692,371 | 9/1987 | Morman et al. | 428/224 |
| 4,707,398 | 11/1987 | Boggs | 428/224 |
| 4,720,415 | * 1/1988 | Vander Wielen et al. | 428/152 |
| 4,734,311 | 3/1988 | Sokolowski | 428/152 |
| 4,741,949 | * 5/1988 | Morman et al. | 128/224 |
| 4,753,843 | 6/1988 | Cook et al. | 428/286 |
| 4,777,080 | 10/1988 | Harris, Jr. et al. | 428/212 |
| 4,789,699 | 12/1988 | Kieffer et al. | 524/271 |
| 4,803,117 | * 2/1989 | Daponte | 428/228 |
| 4,818,597 | 4/1989 | Daponte et al. | 428/284 |

(List continued on next page.)

FOREIGN PATENT DOCUMENTS

| | | | |
|---|---|---|---|
| 0546837 | 6/1993 | (EP) | D04H/1/56 |
| 0548609 | 6/1993 | (EP) . | |
| 9720091 | 6/1997 | (WO) . | |

OTHER PUBLICATIONS

Kraton® Polymers and Compounds: Typical Properties Guide, Shell Chemical Company, 1996.

Primary Examiner—John G. Weiss
Assistant Examiner—Paul Shanoski
(74) Attorney, Agent, or Firm—Bernstein & Associates, P.C.; Jason A. Bernstein (57) ABSTRACT

The present invention comprises a continuous feed spun bonded laminate having improved elastic properties measured at body temperature. The laminate comprises at least one first and second nonelastic layers between which is sandwiched at least one elastic layer, the elastic layer being comprised of a triblock polystyrene-poly(ethylene/propylene)-polystyrene ("SEPS") copolymer having a number average molecular weight of about 81,000 g/mol. The weight percent of styrene is approximately 18% and the weight percent of ethylene/propylene is approximately 82%. The molecular weight increase in the EP block, while holding the molecular weight of the styrene block constant, increases the entanglement density, polymer chain persistence length and the relaxation time. The resulting laminate load decay rate and load loss measurements over a period of 12 hours at body temperature showed marked improvement over known CFSBL product. The laminate is particularly useful as side panel material in training pants because of the resistance to sagging at body temperature.

22 Claims, 2 Drawing Sheets

U.S. PATENT DOCUMENTS

| | | | |
|---|---|---|---|
| 4,879,170 | 11/1989 | Radwanski et al. | 428/233 |
| 4,923,742 | 5/1990 | Killian et al. | 428/283 |
| 4,939,016 | 7/1990 | Radwanski et al. | 428/152 |
| 4,981,747 | 1/1991 | Morman | 428/198 |
| 5,169,706 | 12/1992 | Collier, IV et al. | 428/152 |
| 5,238,733 | 8/1993 | Joseph et al. | 428/284 |
| 5,260,126 | 11/1993 | Collier et al. | 428/288 |
| 5,292,582 | 3/1994 | Gibbs et al. | 428/288 |
| 5,304,599 | 4/1994 | Himes . | |
| 5,324,580 | 6/1994 | Allan et al. | 428/284 |
| 5,332,613 | 7/1994 | Taylor et al. | 428/152 |
| 5,334,446 * | 8/1994 | Quantrille et al. | 428/284 |
| 5,336,545 | 8/1994 | Morman | 428/152 |
| 5,366,786 | 11/1994 | Connor et al. | 428/171 |
| 5,366,793 | 11/1994 | Fitts, Jr. et al. | 428/198 |
| 5,385,775 * | 1/1995 | Wright | 428/284 |
| 5,415,925 | 5/1995 | Austin et al. | 428/287 |
| 5,425,987 | 6/1995 | Shawver et al. | 428/284 |
| 5,470,639 | 11/1995 | Gessner et al. | 428/152 |
| 5,512,358 | 4/1996 | Shawver et al. | 428/286 |
| 5,536,563 | 7/1996 | Shah et al. | 428/224 |
| 5,549,964 | 8/1996 | Shohji et al. | 428/224 |
| 5,582,903 | 12/1996 | Levy et al. | 428/219 |
| 5,630,844 | 5/1997 | Dogan et al. . | |
| 5,635,290 | 6/1997 | Stopper et al. | 428/198 |

* cited by examiner

HIGH PERFORMANCE ELASTIC COMPOSITE MATERIALS MADE FROM HIGH MOLECULAR WEIGHT THERMOPLASTIC TRIBLOCK ELASTOMERS

CROSS REFERENCE TO RELATED APPLICATION

This application claims priority of copending provisional patent application Ser. No. 60/064,554, filed Oct. 3, 1997, entitled HIGH PERFORMANCE ELASTIC COMPOSITE MATERIALS MADE FROM HIGH MOLECULAR WEIGHT THERMOPLASTIC TRIBLOCK ELASTOMERS commonly assigned to the assignee of the present invention.

FIELD OF THE INVENTION

The present invention relates to composite elastic materials produced from polymers whose number and/or weight average molecular weight is characterized as the entanglement molecular weight, which is also a function of the microstructure of the polymer in a continuous filament stretch bonded laminate process. More particularly, the present invention relates to a nonwoven laminate of continuous filaments bonded to a meltblown layer, both of these layers being stretched and bonded between two layers of spunbonded material, the resulting web being relaxed prior to being wound on a takeup roll. The material is useful as side panels in training pants, and other articles where elastic material capable of prolonged performance at body temperature.

BACKGROUND

A key aspect of a disposable garment is fit over time at use temperature, i.e., the body temperature. Therefore, elastic properties are measured at body temperature to simulate the expected end use conditions. Such garments often include portions which are subject to repeated stretch and relaxation stresses over an extended period of time. Examples include garment materials, pads, wound dressings and wraps, diapers and personal care products where elasticity may be desired. A particular example is the side panel of training pants and incontinence undergarments. This side panel is typically made of an elastic material, often a composite, which can withstand the repeated stretch and resulting stress at body temperature.

At body temperature certain elastic properties of polymers become important. Two specific elastic properties measured are the rate of load decay and the load loss observed over a period of twelve hours at body temperature.

A conventional method of forming such elastic composite material is one in which nonelastic spunbond facing materials are combined with an elastomer layer, comprised of high performance elastic strands. The laminate of the elastic strands is made by; bonding the strand to the facings using a meltblown polymer containing a tackifier and/or a pressure sensitive adhesive. This produces a nonwoven elastic composite with desirable elongations, along with improved mechanical and body conformance properties. This process is sometimes known as a continuous filament stretch bonded laminate ("CFSBL") process.

SUMMARY OF THE INVENTION

The present invention comprises a continuous feed spun bonded laminate having improved elastic properties measured at body temperature. In a preferred embodiment the laminate comprises a layer of filaments formed by a continuous filament process, to which is bonded a layer of meltblown fibers. This composite material is then sandwiched between two layers of spunbond fibers after being stretched. The resulting layers are then passed between a pair of niprolls and the resulting laminate is then relaxed prior to winding on a takeup roll.

A unique feature of the present invention is the incorporation of a triblock copolymer as the filament layer. The triblock polymer is preferably of a triblock polystyrene-poly (ethylene/propylene)-polystyrene ("SEPS") copolymer or a polystyrene-poly(ethylene/butylene)-polystyrene ("SEBS") copolymer, each having a number average molecular weight of about 81,000 g/mol. The weight percent of styrene is approximately 18% and the weight percent of ethylene/propylene is approximately 82%. Conventional triblock polymer is typically in the 61,000 g/mol range. The molecular weight increase in the polymer midblock, while holding the molecular weight of the styrene block constant, increases the entanglement density, polymer chain persistence length and the relaxation time. The resulting laminate load decay rate and load loss measurements over a period of 12 hours at body temperature showed marked improvement over known CFSBL product. The laminate is particularly useful as side panel material in training pants because of the resistance to sagging at body temperature.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the several figures of which.

DESCRIPTION OF THE PREFERRED EMBODIMENTS

Definitions

"Block copolymer" is a polymer in which dissimilar polymer segments are connected by a co-valent bond. Thus AAA . . . BBB . . . gives a diblock copolymer of two dissimilar polymers AAA . . . and BBB . . . .

"Persistence length" shall mean the average chain length at which the correlation interaction between two adjacent, generally parallel, polymer chains dies out.

"Entanglement density" shall mean the number of entanglements in a unit volume of a polymer. Entanglement can result from physical segmental entanglement of the polymer molecules, or from polymers segmental interaction of the polymers by intermolecular force.

"Relaxation time" shall mean the characteristic time at which 37% of the initial load is lost in a stress-relaxation experiment (as described in further detail hereinbelow).

"Percent load loss" shall mean the ratio of the difference between the initial load and the load at any time divided by the initial load, multiplied by 100.

"Load response" shall mean the load measured in units of force (grams force pounds) as a function of stretch.

"Meltblown fibers" shall mean fibers formed by extruding a molten thermoplastic material through a plurality of fine, usually circular, die capillaries as molten threads or filaments into converging high velocity gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin. Meltblown fibers are microfibers which may be continuous or discontinuous, are generally smaller than 10 microns in average diameter, and are generally tacky when deposited onto a collecting surface.

DETAILED DESCRIPTION

The present invention comprises a continuous feed spun bonded laminate fabric having improved elastic properties measured at body temperature. A novel aspect of the fabric of the present invention is the incorporation of a high molecular weight triblock copolymer in the continuous filament layer. In a preferred embodiment the laminate fabric comprises a continuous filament layer which is bonded to a meltblown layer. This intermediate composite is stretched and then laminated between two layers of spunbond material. The spunbond layers can be provided from supply rolls or formed during the CFSBL process.

The laminate comprises at least one elastic layer comprised of a triblock polystyrene-poly(ethylene/propylene)-polystyrene ("SEPS") or a triblock polystyrene-poly(ethylene/butylene)-polystyrene ("SEBS") copolymer having a number average molecular weight of about 81,000 g/mol. A range of molecular weight is usable, depending on what specific polymer is used. The practical upper limit of the molecular weight, typically expressed as a number average molecular weight is where viscosity of the polymer prevents extrusion by an appropriate die. The molecular weight range of the triblock copolymer of the present invention can be in the range of about 65,000 to about 100,000 g/mol, more preferably, from about 75,000 to about 90,000 g/mol, and still more preferably, about 81,000 g/mol. Different polymers produce different results, and different uses and projected body temperatures may require different molecular weights being used. For example, use of the fabric in a training pants for children may be subject to a different body temperature than use in winter clothing intended to be underneath several layers of clothing without significant air circulation and higher temperature. Differences in use conditions and repeated stress may also dictate the type of polymer and molecular weight that produces the optimal fabric.

The weight percent of styrene is approximately 18% and the weight percent of ethylene/propylene is approximately 82%. The molecular weight increase in the EP midblock, while holding the molecular weight of the styrene block constant, increases the entanglement density, polymer chain persistence length and the relaxation time. The resulting laminate load decay rate and load loss measurements over a period of 12 hours at body temperature showed marked improvement over known CFSBL product. The laminate is particularly useful as side panel material in training pants because of the resistance to sagging at body temperature.

The practical upper limit on the molecular weight of the midblock of the triblock polymer is where the viscosity prevents extrusion into filaments.

Elastomeric thermoplastic polymers useful in the practice of this invention may be those made from block copolymers such as polyurethanes, copolyether esters, polyamide polyether block copolymers, ethylene vinyl acetates (EVA), block copolymers having the general formula A-B-A' or (A-B)m, such as, but not limited to, copoly(styrene/ethylene-butylene), polystyrene-poly(ethylene-propylene)-polystyrene, (polystyrene/poly(ethylene-butylene)/polystyrene, poly(styrenelethylene-butylene/styrene), EPDM rubbers, ethylene-ethyl acrylate (EEA), ethylene acrylic acid (EAA), ethylene methyl acrylate (EMA), and the like.

Useful elastomeric resins include block copolymers having the general formula A-B-A', where A and A' are each a thermoplastic polymer endblock which contains a styrenic moiety such as a poly (vinyl arene) and where B is an elastomeric polymer midblock such as a conjugated diene or a lower alkene polymer. A and A' can be the same or different. Can also be conjugated dienes as well as the saturated counterpart of the conjugated dienes. Block copolymers of the A-B-A' type can have different or the same thermoplastic block polymers for the A and A' blocks, and the present block copolymers are intended to embrace linear, branched and radial block copolymers. In this regard, the radial block copolymers may be designated-$(A-B)_m$-X, wherein X is a polyfunctional atom or molecule and in which each -$A-B)_m$-radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer," and particularly "A-B-A"' copolymer, is intended to embrace all block copolymers having such rubbery blocks and thermoplastic blocks as discussed above, which can be extruded (e.g., by meltblowing), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. Nos. 4,663,220 and 5,304,599, hereby incorporated by reference.

It is an important feature of the elastomeric material that there is substantially no diblock polymer present. The presence of any appreciable amount of diblock may adversely affect the elasticity of the composite and web formed therefrom.

The elastomeric polymer is formed into a nonwoven web according to any of several procedures known to those skilled in the art, such as, but not limited to, continuous filament or strand extrusion, and the like.

The first and second layers are composed of nonelastic nonwoven polymer fibers. The fibers are preferably spunbond, but can be produced by other processes known to those skilled in the art.

The intermediate elastic nonwoven web comprises a layer of amorphous polymer fibers. The polymer composition desirably comprises an elastomer and may further include a tackifier or other bonding aid to improve adhesion between the intermediate nonwoven web and the opposed film and outer nonwoven layer(s). Examples of suitable polymers include, but are not limited to, elastomeric polyolefins, ethylene-vinyl acetate (EVA), EPDM rubbers, ethylene-ethyl acrylate (EEA), ethylene acrylic acid (EAA), ethylene methyl acrylate (EMA), polyurethane (PU), polyamide polyether block copolymers, block copolymers having the general formula A-B-A' or A-B like copoly(styrene/ethylene-butylene), polystyrene-poly(ethylene-propylene)-polystyrene, polystyrene-poly(ethylene-butylene)-polystyrene, and the like.

In a preferred embodiment, the amorphous polymer comprises one or more elastic polyolefins such as a low density polyethylene elastomer, elastic polypropylene, flexible polyolefins, and tackified polymers such as styrenic block copolymers, polyurethanes or block polyamide polyethers. In one aspect of the present invention the intermediate elastic nonwoven web comprises, at least in part, a low density elastomeric polyolefin polymer component such as, for example, a low density ethylene elastomer component having a density less than 0.89 g/cm$^3$. Desirably the ethylene elastomer comprises a substantially linear ethylene which has a density less than 0.89 g/cm$^3$, desirably from about 0.86 g/cm$^3$ to about 0.88 g/cm$^3$ and even more desirably about 0.87 g/cm$^3$. The ethylene elastomer preferably comprises at least about 50% by weight of the polymeric portion of the bonding layer, and more desirable from about 70% to about 100% by weight. Preferably the ethylene elastomer comprises a polymer wherein the ethylene monomers are polymerized with an alpha-olefin such that the resulting polymer composition has a narrow molecular weight distribution ($\overline{M}_w/\overline{M}_n$) of about 2, homogeneous branching and controlled long chain branching. Suitable alpha-olefins include, but are not limited to, 1-octene, 1-butene, 1-hexene and 4-methyl-pentene. Exemplary polymers include those which are known in the art as "metallocene," "constrained geometry" or "single-site" catalyzed polymers such as those described in U.S. Pat. No. 5,472,775 to Obijeski et al.; U.S. Pat. No. 5,451,450 to Erderly et al.; U.S. Pat. No. 5,539,124 to Etherton et al.; and U.S. Pat. No. 5,554,775 to Krishnamurti et al.; the entire contents of which are incorporated herein by reference.

The metallocene process generally uses a metallocene catalyst which is activated, i.e., ionized, by a co-catalyst. Examples of metallocene catalysts include bis(n-butylcyclopentadienyl)titanium dichloride, bis(n-butylcyclopentadienyl)zirconium dichloride, bis (cyclopentadienyl)scandium chloride, bis(indenyl) zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl (cyclopentadienyl,-1-fluorenyl)zirconium dichloride, molybdocene dichloride, nickelocene, niobocene dichloride, ruthenocene, titanocene dichloride, zirconocene chloride hydride, zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow. However, numerous other metallocene catalysts, single site catalysts, constrained geometry catalysts and/or similar catalyst systems are known in the art; see for example, *The Encyclopedia of Chemical Technology*, Kirk-Othemer, Fourth Edition, vol. 17, Olefinic Polymers, pp. 765–767 (John Wiley & Sons 1996); the contents of which are incorporated herein by reference.

Regarding elastomeric polymers, U.S. Pat. No. 5,204,429 to Kaminsky et al. describes a process which may produce elastic copolymers from cycloolefins and linear olefins using a catalyst which is a stereorigid chiral metallocene transition metal compound and an aluminoxane. U.S. Pat. Nos. 5,278,272 and 5,272,236, both to Lai et al., assigned to Dow Chemical and entitled "Elastic Substantially Linear Olefin Polymers" describe polymers having particular elastic properties, the entire contents of which are incorporated herein by reference. Suitable low density ethylene elastomers are commercially available from Dow Chemical Company of Midland, Mich. under the trade name AFFINITY™, including AFFINITY™ EG8200 (5 MI), XU 58200.02 (30 MI), XU 58300.00 (10 MI) and from Exxon Chemical Co. of Houston, Tex. under the trade name EXACT™ 4049 (4.5 MI, 0.873 g/cm$^3$); 4011 (2.2 MI, 0.888 g/cm$^3$); 4041 (3 MI, 0.878 g/cm$^3$); 4006 (10 MI, 0.88 g/cm$^3$).

In addition, it is believed that the intermediate elastomeric fibrous layer may comprise a polymer blend of the amorphous polymer with one or more other polymers which comprise up to about 75% by weight of the fiber and more desirably up to about 50% of the fiber. It is believed that the fibers may comprise a low density polyethylene elastomer and additional thermoplastic polymers, desirably higher density and/or more crystalline polyolefins. Polyolefins that may be suitable for use with the present invention include, but are not limited to, LLDPE (density between about 0.90 g/cm$^3$–0.92 g/cm$^3$), LDPE (0.915–0.925 g/cm$^3$, ethylene-propylene copolymers, ethylene vinyl acetate, ethylene ethyl acrylate, ethylene acrylic acid, ethylene methyl acrylate and the like.

Examples of additional commercially available elastic polymers include, but are not limited to, Himont CATAL-LOY KS350, KS357 and KS359. Himont Catalloy polymer is an olefinic multistep reactor product wherein an amorphous ethylene propylene random copolymer is molecularly dispersed in a predominantly semicrystalline high propylene monomer/low ethylene monomer continuous matrix, such as described in U.S. Pat. No. 5,300,365 to Ogale. In addition, useful elastomeric resins include block copolymers having the general formula A-B-A' or A-B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated (A-B)$_m$-X, wherein X is a polyfunctional atom or molecule and in which each (A-B) $_m$-radiates from X in a way that A is an endblock or A$_m$-B$_n$, where m may or may not equal n. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer," and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON™ materials which are available from Shell Chemical Company of Houston, Tex. KRATON™ block copolymers are available in several different formulations, a number of which are identified in U.S. Pat. Nos. 4,663,220 and 5,304,599, the entire contents of which are hereby incorporated by reference.

Polymers composed of an elastomeric A-B-A-B tetrablock copolymer may also be used in the practice of this invention. Such polymers are discussed in U.S. Pat. No. 5,332,613 to Taylor et al. In such polymers, A is a thermoplastic polymer block and B is an isoprene monomer unit hydrogenated to substantially a poly(ethylene-propylene) monomer unit. An example of such a tetrablock copolymer is a polystyrene-poly(ethylene-propylene)-polystyrene-poly(ethylene-propylene) or SEPSEP elastomeric block copolymer available from the Shell Chemical Company of Houston, Tex. under the trade designation KRATON™.

Other exemplary elastomeric materials which are believed suitable for use with the present invention include polyurethane elastomeric materials such as, for example, those available under the trademark ESTANE™ from B.F. Goodrich & Co. or MORTHANE™ from Morton Thiokol Corp., polyester elastomeric materials such as, for example, those available under the trade designation HYTREL™ from E.I. DuPont De Nemours & Company, and those known as ARNIEL™ formerly available from Akzo Plastics of Arnhem, Holland and now available from DSM of Sittard, Holland.

In order to improve the thermal compatibility of the intermediate nonwoven web with those of the adjoining layers, it may be desirable to add a tackifier or bonding aid to the elastic polymer composition. Examples of suitable tackifiers include, but are not limited to those described in U.S. Pat. No. 4,789,699 to Kieffer et al. Examples of commercially available tackifiers are REGALRE™ 1126 available from Hercules Inc. of Wilmington, Del.; ESCOREZ™ 5300 from Exxon Chemical Co. and WINGTACK™ 95 from Goodyear Chemical Co. of Akron, Ohio. The amount of tackifier added will vary with respect to the particular elastic polymer employed in the intermediate elastic fiber layer and those polymers comprising adjoining layers. Although the amount of tackifier added to the elastic intermediate layer will vary, often addition of about 5 to about 20% by weight of the polymer composition is desirable.

In a preferred embodiment, the intermediate elastic nonwoven web comprises a matrix of fibers, such as a web of meltblown fibers. In a further aspect the fibrous elastic layer may comprise a layer of spunbond fibers and/or staple length fibers of similar basis weight, desirably the nonwoven web has a basis weight of between about 10 g/m² and about 100 g/m², and more desirably a basis weight between about 25 g/m² and about 60 g/m². The selection of the basis weight will vary with respect to the basis weight of the overall laminate as well as the recovery properties of the film and/or outer nonwoven layer. Where both the outer nonwoven layer and film are extensible but inelastic materials, a higher basis weight intermediate/medial elastic fiber layer will often be required to provide an overall laminate with elastic properties. However, where the film and/or outer nonwoven layer is also elastic, the intermediate elastic web can comprise less of the overall laminate basis weight.

Useful elastomeric resins include, but are not limited to, block copolymers having the general formula A-B-A' or A-B, where A and A' are each a thermoplastic polymer endblock which contains a styrenic moiety such as a poly(vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated $(A-B)_m$-X, wherein X is a polyfunctional atom or molecule and in which each $(A-B)_m$-radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer," and particularly A-B-A' and A-B block copolymer, is intended to embrace all block copolymers having such rubbery blocks and thermoplastic blocks as discussed above, which can be extruded (e.g., by meltblowing and sheet forming), and without limitation as to the number of blocks. The elastomeric nonwoven web may be formed from, for example, elastomeric (polystyrene/poly(ethylene-butylene)/polystyrene) block copolymers. Commercial examples of such elastomeric copolymers are, for example, those known as KRATON® materials which are available from Shell Chemical Company of Houston, Tex. KRATON® block copolymers are available in several different formulations, a number of which are identified in U.S. Pat. Nos. 4,663,220 and 5,304,599, hereby incorporated by reference.

Polymers composed of an elastomeric A-B-A-B tetrablock copolymer may also be used in the practice of this invention as the elastic layer. Such polymers are discussed in U.S. Pat. No. 5,332,613 to Taylor et al. In such polymers, A is a thermoplastic polymer block and B is an isoprene monomer unit hydrogenated to a substantially a poly(ethylene-propylene) monomer unit. An example of such a tetrablock copolymer is a polystyrene-poly(ethylene-propylene)-polystyrene-poly(ethylene-propylene) or SEPSEP elastomeric block copolymer available from the Shell Chemical Company of Houston, Tex. under the trademark KRATON®.

Other exemplary elastomeric materials which may be used include polyurethane elastomeric materials such as, for example, those available under the trademark ESTANE® from B.F. Goodrich & Co. or MORTHANE® from Morton Thiokol Corp., polyester elastomeric materials such as, for example, those available under the trade designation HYTREL® from E.I. DuPont De Nemours & Company, and those known as ARNITEL®, formerly available from Akzo Plastics of Arnhem, Holland and now available from DSM of Sittard, Holland.

Another suitable material is a polyester block amide copolymer having the formula:

Where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235 C/1 Kg load); a modulus of elasticity in flexure of from about 20 MPa to about 200 MPa, as measured in accordance with ASTM D-790; a tensile strength at break of from about 29 MPa to about 33 MPa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235 C/1 Kg load); a modulus of elasticity in flexure of about 29.50 MPa, as measured in accordance with ASTM D-790; a tensile strength at break of about 29 MPa, a measured in accordance with ASTM D-639; and an elongation at break of about 650 percent as measured in accordance with ASTM D-638. Such materials are available in various grades under the trade designation PEBAX® from ELF Atochem Inc., Philadelphia, Pa. Examples of the use of such polymers may be found in U.S. Pat. Nos. 4,724,184, 4,820,572 and 4,923,742 hereby incorporated by reference, to Killian et al. and assigned to the same assignee as this invention. Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117.

The thermoplastic copolyester elastomers include copolyetheresters having the general formula:

where "G" is selected from the group consisting of poly(oxyethylene)-alpha,omega-diol, poly(oxypropylene)-alpha,omega-diol, poly(oxytetramethylene)-alpha,omega-diol and "a" and "b" are positive integers including 2, 4 and 6, "m" and "n" are positive integers including 1–20. Such materials generally have an elongation at break of from about 600 percent to 750 percent when measured in accordance with ASTM D-638 and a melt point of from about 350° F. to about 400° F. (176 to 205° C.) when measured in accordance with ASTM D-2117.

Commercial examples of such copolyester materials are, for example, those known as ARNIFEL®, formerly available from Akzo Plastics of Arnhem, Holland and now available from DSM of Sittard, Holland, or those known as HYTREL® which are available from E.I. duPont de Nemours of Wilmington, Del. Formation of an elastomeric nonwoven web from polyester elastomeric materials is disclosed in, for example, U.S. Pat. No. 4,741,949 to Morman et al. and U.S. Pat. No. 4,707,398 to Boggs.

Figure 1:
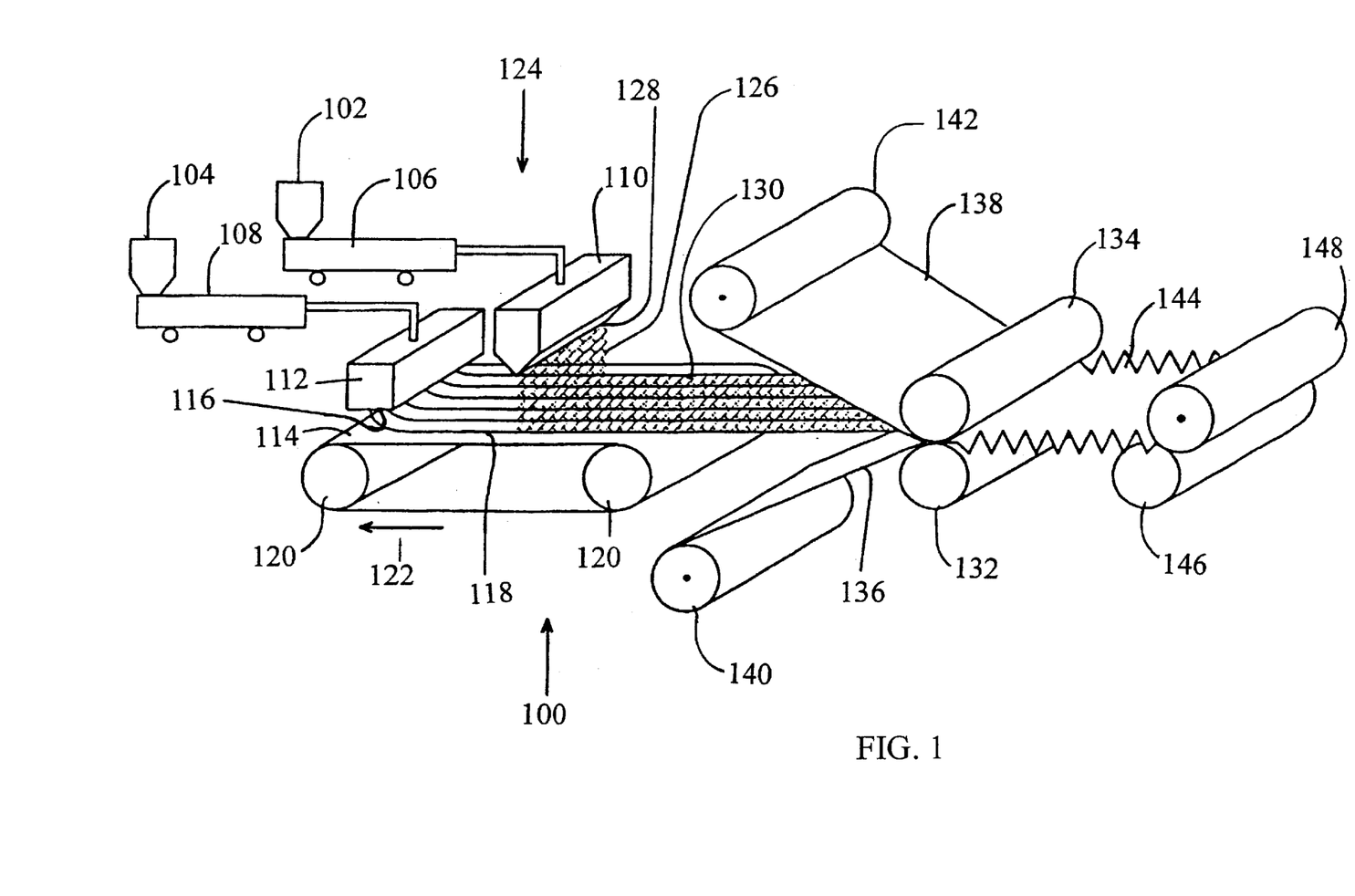
FIG. 1 is an isometric view of an apparatus for forming a continuous filament stretch bonded laminate of the present invention.

In a preferred embodiment, the laminate of the present invention is formed by sandwiching an elastic layer between two layers of nonelastic webs. FIG. 1 shows an apparatus for forming the laminate of the present invention in which, in general a continuous filament stretch bonded laminate is formed. An example of this process is described in U.S. Pat. No. 5,385,775, issued to Wright et al., the disclosure of which is incorporated by reference herein. The process is generally represented by reference numeral 100. In forming the fibers and the filaments which are used in the elastic fibrous web, pellets or chips, etc. (not shown) of an extrudable elastomeric polymer are introduced into a pellet hoppers 102 and 104 of extruders 106 and 108.

Each extruder has an extrusion screw (not shown) which is driven by a conventional drive motor (not shown). As the polymer advances through the extruder, due to rotation of the extrusion screw by the drive motor, it is progressively heated to a molten state. Heating the polymer to the molten state may be accomplished in a plurality of discrete steps with its temperature being gradually elevated as it advances through discrete heating zones of the extruder 106 toward a meltblowing die 110 and extruder 108 toward a continuous filament forming means 112. The meltblowing die 110 and the continuous filament forming means 112 may be yet another heating zone where the temperature of the thermoplastic resin is maintained at an elevated level for extrusion. Heating of the various zones of the extruders 106 and 108 and the meltblowing die 110 and the continuous filament forming means 112 may be achieved by any of a variety of conventional heating arrangements (not shown).

The elastomeric filament component of the anisotropic elastic fibrous web may be formed utilizing a variety of extrusion techniques. For example, the elastic filaments may be formed utilizing one or more conventional meltblowing die arrangements which have been modified to remove the heated gas stream (i.e., the primary air stream) which flows generally in the same direction as that of the extruded threads to attenuate the extruded threads. This modified meltblowing die arrangement 112 usually extends across a foraminous collecting surface 114 in a direction which is substantially transverse to the direction of movement of the collecting surface 114. The modified die arrangement 112 includes a linear array 116 of small diameter capillaries aligned along the transverse extent of the die 112 with the transverse extent of the die being approximately as long as the desired width of the parallel rows of elastomeric filaments which is to be produced. That is, the transverse dimension of the die is the dimension which is defined by the linear array of die capillaries. Typically, the diameter of the capillaries will be on the order of from about 0.01 inches to about 0.02 inches, for example, from about 0.0145 to about 0.018 inches. From about 5 to about 50 such capillaries will be provided per linear inch of die face. Typically, the length of the capillaries will be from about 0.05 inches to about 0.20 inches, for example, about 0.113 inches to about 0.14 inches long. A meltblowing die can extend from about 20 inches to about 60 or more inches in length in the transverse direction.

Since the heated gas stream (i.e., the primary air stream) which flows past the die tip is greatly reduced or absent, it is desirable to insulate the die tip or provide heating elements to ensure that the extruded polymer remains molten and flowable while in the die tip. Polymer is extruded from the array 116 of capillaries in the modified die 112 to create extruded elastomeric filaments 118.

The extruded elastomeric filaments 118 have an initial velocity as they leave the array 116 of capillaries in the modified die 112. These filaments 118 are deposited upon a foraminous surface 114 which should be moving at least at the same velocity as the initial velocity of the elastic filaments 118. This foraminous surface 114 is an endless belt conventionally driven by rollers 120. The filaments 118 are deposited in substantially parallel alignment on the surface of the endless belt 114 which is rotating as indicated by the arrow 122. Vacuum boxes (not shown) may be used to assist in retention of the matrix on the surface of the belt 114. The tip of the die 112 is should be as close as practical to the surface of the foraminous belt 114 upon which the continuous elastic filaments 118 are collected. For example, this forming distance may be from about 2 inches to about 8 inches. Desirably, this distance is from about 2 inches to about 8 inches.

It may be desirable to have the foraminous surface 114 moving at a speed that is much greater than the initial velocity of the elastic filaments 118 in order to enhance the alignment of the filaments 118 into substantially parallel rows and/or elongate the filaments 118 so they achieve a desired diameter. For example, alignment of the elastomeric filaments 118 may be enhanced by having the foraminous surface 114 move at a velocity from about 2 to about 10 times greater than the initial velocity of the elastomeric filaments 118. Even greater speed differentials may be used if desired. While different factors will affect the particular choice of velocity for the foraminous surface 114, it will typically be from about four to about eight times faster than the initial velocity of the elastomeric filaments 118.

Desirably, the continuous elastomeric filaments are formed at a density per inch of width of material which corresponds generally to the density of capillaries on the die face. For example, the filament density per inch of width of material may range from about 10 to about 120 such filaments per inch width of material. Typically, lower densities of filaments (e.g., 10–35 filaments per inch of width) may be achieved with only one filament forming die. Higher densities (e.g., 3–120 filaments per inch of width) may be achieved with multiple banks of filament forming equipment.

The meltblowing fiber component of the anisotropic elastic fibrous web is formed utilizing a conventional meltblowing process represented by reference numeral 124. Meltblowing processes generally involve extruding a thermoplastic polymer resin through a plurality of small diameter capillaries of a meltblowing die as molten threads into a heated gas stream (the primary air stream) which is flowing generally in the same direction as that of the extruded threads so that the extruded threads are attenuated, i.e., drawn or extended, to reduce their diameter. Such meltblowing techniques, and apparatus therefor, are discussed fully in U.S. Pat. No. 4,663,220, the contents of which are incorporated herein by reference.

In the meltblowing die arrangement 110, the position of air plates which, in conjunction with a die portion define chambers and gaps, may be adjusted relative to the die portion to increase or decrease the width of the attenuating gas passageways so that the volume of attenuating gas passing through the air passageways during a given time period can be varied without varying the velocity of the attenuating gas. Generally speaking, lower attenuating gas velocities and wider air passageway gaps are generally preferred if substantially continuous meltblowing fibers or microfibers are to be produced.

The two streams of attenuating gas converge to form a stream of gas which entrains and attenuates the molten threads as they exit the orifices, into fibers depending upon the degree of attenuation, microfibers, of a small diameter which is usually less than the diameter of the orifices. The gas-borne fibers or microfibers 126 are blown, by the action of the attenuating gas, onto a collecting arrangement which, in the embodiment illustrated in FIG. 1, is the foraminous endless belt 114 which carries the elastomeric filament in substantially parallel alignment. The fibers or microfibers 126 are collected as a coherent matrix of fibers on the surface of the elastomeric filaments 118 and foraminous endless belt 114 which is rotating as indicated by the arrow 122. If desired, the meltblowing fibers or microfibers 126 may be collected on the foraminous endless belt 114 at numerous impingement angles. Vacuum boxes (not shown) may be used to assist in retention of the matrix on the surface of the belt 114. Typically the tip 128 of the die 110 is from about 6 inches to about 14 inches from the surface of the foraminous belt 116 upon which the fibers are collected. The entangled fibers or microfibers 124 autogenously bond to at least a portion of the elastic continuous filaments 118 because the fibers or microfibers 124 are still somewhat tacky or molten while they are deposited on the elastic continuous filaments 118, thereby forming the anisotropic elastic fibrous web 130.

At this point, it may be desirable to lightly calendar the elastic fibrous web of meltblowing fibers and filaments in order to enhance the autogenous bonding. This calendering may be accomplished with a pair of nip rolls 132 and 134 under sufficient pressure (and temperature, if desired) to cause permanent autogenous bonding between the elastomeric filaments and the elastomeric meltblown fibers.

As discussed above, the elastomeric filaments and elastomeric meltblowing fibers are deposited upon a moving foraminous surface. In one embodiment of the invention, meltblown fibers are formed directly on top of the extruded elastomeric filaments. This is achieved by passing the filaments and the foraminous surface under equipment which produces meltblown fibers. Alternatively, a layer of elastomeric meltblown fibers may be deposited on a foraminous surface and substantially parallel rows of elastomeric filaments may be formed directly upon the elastomeric meltblown fibers. Various combinations of filament forming and fiber forming equipment may be set up to produce different types of elastic fibrous webs. For example, the elastic fibrous web may contain alternating layers of elastomeric filaments and elastomeric meltblowing fibers. Several dies for forming meltblown fibers or creating elastomeric filaments may also be arranged in series to provide superposed layers of fibers or filaments.

The elastomeric meltblown fibers and elastomeric filaments may be made from any material which may be manufactured into such fibers and filaments. Generally, any suitable elastomeric fiber forming resins or blends containing the same may be utilized for the elastomeric meltblown fibers and any suitable elastomeric filament forming resins or blends containing the same may be utilized for the elastomeric filaments. The fibers and filaments may be formed from the same or different elastomeric resin. Tackifiers and/or pressure sensitive adhesives may be incorporated into the meltblown polymer.

A first spunbond layer 136 and a second spunbond layer 138 are unwound from takeup rolls 140 and 142, respectively, and fed through the calendar rolls 132 and 134 on either side of the web 130. As the three layers are passed through the calendar rolls 132 and 134 the material is laminated together by adhesive forces and now form the composite material 144.

The web 130 is stretched to add tension as it is removed from the foraminous surface 114, i.e., by having the speed of the calendar rolls 132 and 134 being set faster than the linear speed of the foraminous surface 114, as is known to those skilled in the art. After the composite web 144 exits the calendar rolls 132 and 134, it is relaxed by passing the web 144 through a second set of calendar rolls 144 and 146, which are operating at a speed slower than the calendar rolls 132 and 134, thus inducing a relaxing of the fibers. The resulting web is further processed or removed onto a takeup roll (not shown). It is to be understood by those skilled in the art that additional guide rolls or the like may be used for more control or convenient processing of the material of the present invention.

The continuous filament process is the preferred process to form filaments of the elastomeric triblock polymer layer of the present invention because of the high molecular weight of the polymer, which tends to produce poorer quality meltblown filaments. It is possible that other components can be used to permit quality meltblown filaments to be produced, or to modify the meltblown die or apparatus to accommodate higher molecular weight polymers. But, since heretofore such materials as described in the present disclosure have not been used successfully in a meltblown process, the continuous filament process was used. Additionally, the composite material of the present invention can incorporate a plurality of layers of each of the individual layers of material. For example, two layers of meltblown material can sandwich the filaments. Or, two filament layers can sandwich a single meltblown layer. Different combinations and sequences of the layers is anticipated as being possible, depending on the ultimate properties desired.

The modified material used in the elastic layer of the present invention provides improved elastic properties. The increased molecular weight of the midblock portion of the A-B-A' polymer results in increased persistence length of the polymer chains. The increase in the overall molecular weight also increases entanglement density, which increases the time for segments uncoil or disentangle. The increase in entanglement also reduces slippage of the midblock domain. Relaxation time is correspondingly increased. All these factors favor the improvement of the elastic character of the polymer of the present invention. The absence of the diblock polymer also improves the stress-relaxation behavior because the lack of plasticizing affect their compatibilization of the styrene and rubber block.

The present invention provides a continuous filament stretch bonded laminate ("CFSBL") material having lower cost and better performance than conventional CFSBL materials based on tetrablock KRATON polymers, when used at body temperature.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims. The invention will be further described in connection with the following examples, which are set forth for purposes of illustration only. Parts and percentages appearing in such examples are by weight unless otherwise stipulated.

EXAMPLES

Test Procedures

Stress-Elongation

Samples used for stress-elongation test were in the in the form of a strand or fiber. The strand was clamped in the jaws of a Materials Testing System (MTS) Sintech 1/S tensile testing frame. A grip to grip distance of 3 inches was used in all tests. The samples were displaced at a rate of 2 inches/minute via the cross-head movement.

From a knowledge of the initial cross-sectional area and the initial grip-to-grip distance the engineering stress and the percentage (%) elongation were calculated. From the stress-elongation data, the initial shear modulus was calculated using rubber elasticity theory. The yield stress, the stress at break and elongation at break were also obtained from the normalized data.

Stress Relaxation

The stress relaxation test was also carried out on a MTS Sintech 1/S tensile test frame. The test specimen was clamped between the jaws at a 3" grip to grip distance. The sample and the grip fixtures were enclosed in an environmental chamber. The sample, after clamping, was equilibrated at 100° F. for 3 minutes. The sample was then elongated to a final constant elongation of 4.5 inches (50% elongation) at a cross-head displacement speed of 20"/minute. The load required to maintain the 50% elongation as a function of time was monitored. The data was acquired using the MTS Sintech Test Works data acquisition capability.

The data thus obtained was reduced by calculating the engineering stress (lb/in$^2$, psi) from a knowledge of the initial cross-sectional area of the sample. Strain (elongation) was calculated from the initial grip-to-grip distance and the constant elongation. Ratio of the stress and strain gives the stress relaxation modulus (psi). The data was fitted to the power-law model given below to obtain, a material characteristic, the exponent m.

$$\sigma = \sigma_{t=0.1\ min} t^{-m}$$

Another parameter that was also obtained from this experiment was the percentage loss of load at the end of the experiment. The load loss was obtained from a knowledge of the initial load and final load using the following equation:

$$\frac{(\text{INITIAL LOAD} - \text{FINAL LOAD})}{\text{INITIAL LOAD}} \times 100$$

Equilibrium Hysteresis

The equilibrium hysteresis was obtained by cycling the samples between zero and 100% elongation. The MTS Sintech 1/S screw driven frame was used for the acquisition of the hysteresis data. The cross-head was displaced at a rate of 20 in./min. The samples were cycled 10 times. The data acquired was at a rate of 100 data points per cycle. The loading and unloading energy were calculated by integrating the area under the respective. Percentage hysteresis was then calculated according to the following equation.

$$\% \text{ HYSTERESIS} = \frac{(\text{LOADING ENERGY} - \text{UNLOADING ENERGY})}{\text{LOADING ENERGY}} \times 100$$

Tension Set

In this intermittent stress-elongation experiment, a sample is stretched to a predetermined elongation, released and then stretched to the next greater degree of elongation and so on. The remaining strain at a given time after the removal of the applied stress is then measured. The tension set gives a measure of the irreversibility of the deformation.

Dynamic Mechanical Thermal Analysis ("DMTA")

DMTA is an analytical tool known to those skilled in the art for analyzing the storage modulus of a fabric and a detailed review of the technique is not needed. Briefly however, storage modulus is plotted against temperature and the tangent delta ("tanδ"). In a given plot of a material there is an area known as the "rubbery plateau," a flattened area of the curve, which related to the dimensional stability of the polymer. A longer rubbery plateau is indicative of a more stable polymer. The rubbery plateau of a given material is lower for a lower molecular weight and higher for a higher molecular weight.

As the molecular weight of the triblock copolymer midblock increases, the softness of the polymer increases, as indicated by a decreased modulus.

The tan δ is a ratio of the loss modulus to the storage modulus. The higher molecular weight material will have a higher and sharper peak tan δ, which is more desirable. A sharp transition indicates that the hard styrene domain is well phase segregated, which is desirable.

Example 1

Sample 1 was a CFSBL fabric, wherein the continuous filaments were produced from KRATON RP6608, a SEPS triblock polymer having a number average molecular weight of about 81,000 g/mol, containing a tackifier and polyethylene wax. Sample 2 was a control, a CFSBL fabric, wherein the continuous filaments were produced from KRATON RP 6588 SEPSEP tetrablock polymer, containing a tackifier and polyethylene wax. Sample 3 was a CFSBL fabric, wherein the continuous filaments were produced from a KRATON SEPS triblock polymer having a number average molecular weight of about 61,000 g/mol, containing a tackifier and polyethylene wax. The sample fabrics were produced according to the process described above, where the process parameters are set forth in Table 7 at the end of the specification. Table 8 show various process parameters for different material runs.

TABLE 1

STRESS ELONGATION BEHAVIOR AT BODY TEMPERATURE

| SAMPLE ID | MODULUS (psi) | $\sigma_y$ (%) | $\gamma_y$ (%) | STS (%) |
|---|---|---|---|---|
| Sample 1 | 92 | 25 | 18 | 227 |
| Sample 2 | 91 | 18 | 14 | 174 |

$\sigma_y$ is stress at yield; $\lambda_y$ is elongation at yield; STS is "stretch to stop," i.e., the elastic limit before the spunbond layer takes over the stress-elongation behavior. The test results indicated that the stress at yield was about 39% better for the triblock compared to the tetrablock polymer. The elongation at yield was about 28% better for the triblock. The stretch to stop data was about 30% improved for the triblock.

TABLE 2

HYSTERESIS BEHAVIOR AT BODY TEMPERATURE

| SAMPLE ID | $H_1$ (%) | $H_3$ (%) | $H_7$ (%) | $H_{10}$ (%) |
|---|---|---|---|---|
| Sample 1 | 16 | 10 | 10 | 9 |
| Sample 2 | 24 | 17 | 16 | 16 |

TABLE 3

HYSTERESIS BEHAVIOR AT ROOM TEMPERATURE

| SAMPLE ID | $H_1$ (%) | $H_3$ (%) | $H_7$ (%) | $H_{10}$ (%) |
|---|---|---|---|---|
| Sample 1 | 20 | 12 | 11 | 11 |
| Sample 2 | 29 | 19 | 19 | 18 |

$H_i$ is the hysteresis of the $i^{th}$ cycle. i=1,3,7,10. Lower hysteresis numbers indicate better elasticity properties of the fabric. The control Sample 2 had higher hysteresis and resulting poorer elasticity than Sample 1.

TABLE 4

TENSION SET BEHAVIOR AT BODY TEMPERATURE

| SAMPLE ID | S (25%) | S (50%) | S (100%) | S (200%) | S (300%) |
|---|---|---|---|---|---|
| Sample 1 | 1 | 2 | 3 | 8 | 8 |
| Sample 2 | 1 | 2 | 4 | 26 | 24 |

TABLE 5

TENSION SET BEHAVIOR AT ROOM TEMPERATURE

| SAMPLE ID | S (25%) | S (50%) | S (100%) | S (200%) | S (300%) |
|---|---|---|---|---|---|
| Sample 1 | 1 | 2 | 4 | 7 | 11 |
| Sample 2 | 1 | 2 | 6 | 21 | 39 |

S is the tension set. Higher tension set indicates poorer elastic properties. Beyond 100% the control Sample 2 numbers are significantly poorer than Sample 1. Over a longer period of time at body temperature Sample 1 will have better elastic behavior than control Sample 2.

TABLE 6

12 HRS. STRESS RELAXATION BEHAVIOR AT BODY TEMPERATURE

| SAMPLE ID | LOAD DECAY SLOPE | LOAD LOSS (%) |
|---|---|---|
| Sample 1 | −0.08 | 40 |
| Sample 2 | −0.10 | 52 |
| Sample 3 | −0.10 | 52 |

Lower numbers indicate better elastic behavior. The difference between the samples is significant. The difference of 0.02 in slope between Sample 1 and Samples 2 and 3 is remarkable because the relationship in slope is an exponential one.

Figure 2:
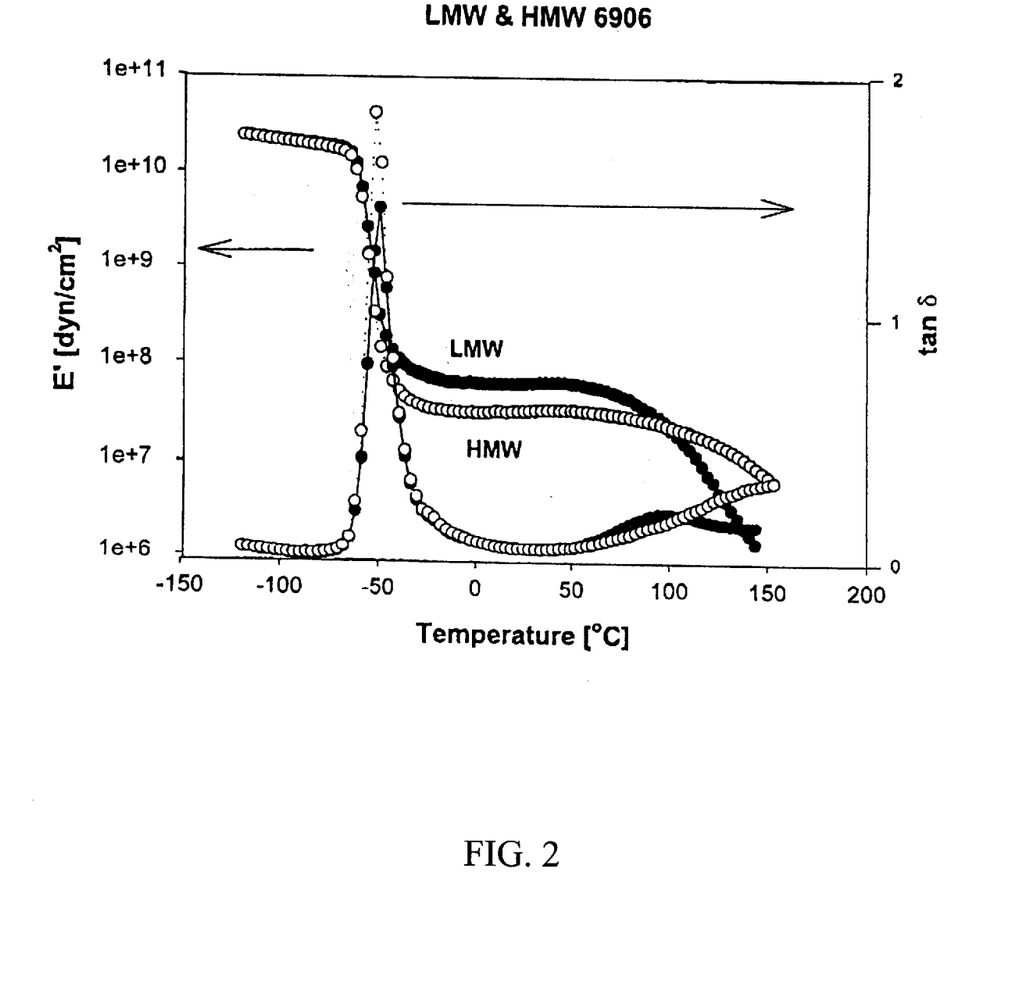
FIG. 2 is a graph of storage modulus plotted against temperature and the tangent delta.

FIG. 2 is a graph of the storage modulus, E', measured in dyn/cm², plotted against temperature (in °C.), and tan δ. The lower molecular weight Sample 3 is shown in solid circles and the higher molecular weight Sample 1 is shown in open circles. The sigmoidal curves are the modulus results. The curve peaking at about −50° C. is the tan δ. The graph shows a longer and lower modulus of the high molecular weight material is more elastic and has superior properties over the shorter and higher modulus curve of the lower molecular weight material. The higher sharp tan δ peak of the higher molecular weight material is indicative of better phase segregation of the styrene domain than in the lower molecular weight material.

The three sample fabrics described above were produced according to the process described above, where the process parameters are set forth in Table 7.

TABLE 7

RESEARCH MELTBLOWN LINE

| Roll Number | EXT 1 | EXT 2 | WTC 96 0314 EX 1 | WTC 96 0314 EX 2 | EX 1 | EX 2 |
|---|---|---|---|---|---|---|
| Polymer ID | 6588 | 6588 | KG6608 | KG6608 | | |
| Die Tip | DFN | #4 | | | | |
| Recess Gap (Inches) | Open | .0130 | | | | |
| Forming Height (Inches) | 2.5 | 8.75 | | | | |
| Underwire Vacuum 1 (Inches H2O) | NA | Open | | | | |
| Underwire Vacuum 2 (Inches H2O) | NA | | | | | |
| Underwire Vacuum 3 (Inches H2O) | NA | | | | | |
| Forming Vacuum Control, % Output | 26.0 | | | | | |
| Forming Vacuum Control, P.V. | | | | | | |
| Line Speed (fpm) | 24 | | | | | |
| Basis Weight (osy/gsm) | | | | | | |
| Yards per Roll | | | | | | |
| PIH | 1.5 | .35 | 1.56 | .37 | 1.59 | .40 |
| Treatment or Quench | NA | NA | | | | |
| Soray pressure | NA | NA | | | | |
| EXTRUDER: | | | | | | |
| Extruder Amps    EXT 2 | 15 | | 22 | | 22 | |
| Extruder RPM | 19 | 10.5 | 19 | 12 | 20 | 13 |
| Extruder PSI | 500 | | 500 | | 500 | 180° |
| Temps - Zone 1    Zn 1 | 400 | 180° C. | 400 | 200° C. | 450 | 240° |
| Zone 2    Zn 2 | 440 | 240° C. | 440 | 250° C. | 440 | 250° |
| Zone 3    Zn 3 | 495 | 250° C. | 495 | 260° C. | 495 | 250° |
| Zone 4    Adapt | 525 | 250° C. | 525 | 260° C. | 525 | 250° |
| Valve Zone Temp  Hose | | 255° C. | | 270° C. | | 255° |
| Pipe Zone 1 Temp | | | | | | |
| Filter Zone 1 Temp | | | | | | |
| Filter Zone 2 Temp | | | | | | |
| Pipe Zone 2 Temp | | | | | | |
| Pipe Zone 3 Temp | | | | | | |
| Mixer Zone Temp | | | | | | |
| Filter Inlet PSI | 490 | | 470 | | 450 | |
| Spin Pump Inlet Temp | 525 | | 525 | | 525 | |
| Spin Pump Temp | 525 | | 525 | | 525 | |
| Spin Pump Amps | 1.5 | | 3 | | 3 | |
| Spin Pump RPM | 35% | | 41% | | 41% | |
| Spin Pump PSI | 340 | | 130 | | 60 | |
| Hot Air Controller SP | 525 | | 525 | 525 | | |
| Hot Air Inlet Temp | 548 | | 503 | 553 | | |
| Hot Air Outlet Temp | 525 | | 485 | 522 | | |
| DIE BODY: | | | | | | |
| Die Body Inlet PSI | NA | | NA | | NA | |
| Temps - Zone 1 | 525 | | 525 | | 525 | |
| Zone 2 | 525 | | 525 | | 525 | |
| Zone 3 | 525 | | 525 | | 525 | |
| Zone 4 | 525 | | 525 | | 525 | |
| Die Tip Pressure, PSI | 44 | 20 | 112 | 10 | 102 | 30 |
| Die Tip Temp | NA | | NA | | NA | |
| Melt Temp | 438 | | 441 | | 442 | |
| Primary Air PSI | NA | | NA | | NA | |
| Primary Air SCFM | SP69.9 | | SP76.5 | | SP 70.0 | |
| Primary Air Temp | SP610 | 465° F. | SP700° F. | 555° F. | 600° F. | 540 |
| Comments | New SCR PACK | | | | | |

Table 8 shows various process parameters for different material runs. For the process parameters of Table 8, the die was 20" wide, having 18 holes/inch, the holes having a diameter of 0.0275", and having a 6:1 L/D. The facings were 0.4 osy Lurgi. The forming distance was 3.5 inches for the filaments and 9 inches for the MB.

TABLE 8

VARIOUS PROCESS PARAMETERS

|  | RS-5 KG-6608 | RS-7 KG-6588 | RS-6 KG-6608 | RS-8 KG-6588 | #8 KG-6508 | #11 KG-6608 |
|---|---|---|---|---|---|---|
| MB (102) | .15 #/inch/hr 525° F. | .15 #/inch/hr 525° F. | .33 #/inch/hr 525° F. | .33 #/inch/hr 525° F. | .33 #/inch/hr 525° F. | .33 #/inch/hr 525° F. |
| Filaments (104) | 1.5 #/inch/hr 550° F. | 1.5 #/inch/hr 525° F. | 3.0 #/inch/hr 550° F. | 3.0 #/inch/hr 525° F. | 3.0 #/inch/hr 525° F. | 3.0 #/inch/hr 550° F. |
| Wire Speed (122) | 33 ft/min. | 30 ft/min. | 58 ft/min. | 58 ft/min. | 22.5 ft/min. | 25 ft/min. |
| Bonder Speed (132,134) | 122 ft/min. | 111 ft/min. | 203 ft/min. | 203 ft/min. | 125 ft/min. | 125 ft/min. |
| Bonder Temp. (132, 134) | Anvil 127° F. Pattern 124° F. | Anvil 130° F. Pattern 129° F. | Anvil 129° F. Pattern 126° F. | Anvil 131° F. Pattern 129° F. | Similar to other examples | Similar to other examples |
| Bond Pattern | Ramisch | Ramisch | Ramisch | Ramisch | Smooth | Smooth |
| Winder Speed (146, 148) | 52 ft/min. | 47 ft/min. | 86 ft/min. | 90 ft/min. | 90 ft/min. | |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

It should further be noted that any patents, applications or publications referred to herein are incorporated by reference in their entirety.

What is claimed is:

1. A composite elastic material having improved elastic properties at body temperature, comprising:
   A) a first layer of substantially parallel filaments formed of an elastomeric polymer, said polymer having a number average molecular weight of from about 65,000 g/mol to about 100,000 g/mol, wherein said first layer is substantially free of diblock polymer;
   B) a second layer of elastomeric meltblown fibers, said meltblown fibers bonded to at least a portion of the first layer filaments;
   C) a third layer of spunbond fibers; and,
   D) a fourth layer of spunbond fibers;
      wherein said first and second layers are disposed between said third and fourth layers.

2. The composite elastic material of claim 1, wherein said elastomeric polymer of said first layer comprises an A-B-A' triblock copolymer wherein A and A' are the same or different thermoplastic polymer, and wherein B is an elastomeric polymer block.

3. The composite elastic material of claim 2, wherein A is a styrene-based polymer.

4. The composite elastic material of claim 2, wherein B is selected from the group consisting of ethylene/propylene and ethylene/butylene.

5. The composite elastic material of claim 4, wherein said ethylene/propylene and ethylene/butylene are saturated.

6. The composite elastic material of claim 4, wherein said ethylene/propylene and ethylene/butylene are unsaturated.

7. The composite elastic material of claim 2, wherein said elastomeric polymer comprises about 18% styrene-based material and about 82% midblock material.

8. The composite elastic material of claim 1, wherein said material has a percent load loss at body temperature over a twelve hour period of less than about 40%.

9. The composite elastic material of claim 1, wherein said material has a percent load loss at body temperature over a twelve hour period of less than about 50%.

10. The composite elastic material of claim 1, wherein said material has a load decay slope at body temperature over a twelve hour period of about −0.08.

11. The composite elastic material of claim 1, wherein said material has a load decay slope at body temperature over a twelve hour period of about −0.10.

12. The composite elastic material of claim 1, wherein said elastomeric polymer has a number average molecular weight of from about 65,000 g/mol to about 100,000 g/mol.

13. The composite elastic material of claim 1, wherein said elastomeric polymer has a number average molecular weight of from about 75,000 g/mol to about 90,000 g/mol.

14. The composite elastic material of claim 1, wherein said elastomeric polymer has a number average molecular weight of about 81,000 g/mol.

15. The composite elastic material of claim 1, wherein said meltblown fibers comprise an elastomeric polymer selected from the group consisting of elastic polyesters, elastic polyurethanes, elastic polyamides, elastic copolymers of ethylene and at least one vinyl monomer, and elastic A-B-A' block copolymers wherein A and A' are the same or different thermoplastic polymers, and wherein B is an elastomeric polymer block.

16. The composite elastic material of claim 15, wherein said elastomeric polymer is blended with a processing aid.

17. The composite elastic material of claim 15, wherein said elastomeric polymer is blended with a tackifying resin.

18. The composite elastic material of claim 1, further comprising a fifth layer of meltblown material.

19. The composite elastic material of claim 11, wherein said second and said fifth layers of meltblown material are bonded to both sides of said first layer.

20. A training pants article having side panels incorporating a composite elastic material, said elastic material comprising:
- A) a first layer of substantially parallel filaments formed of an elastomeric polymer, said polymer having a number average molecular weight of from about 65,000 g/mol to about 100,000 g/mol, wherein said first layer is substantially free of diblock polymer;
- B) a second layer of elastomeric meltblown fibers, said meltblown fibers bonded to at least a portion of the first layer filaments so that the elastic fibrous web is anisotropic;
- C) a third layer of spunbond fibers; and,
- D) a fourth layer of spunbond fibers;

wherein said first and second layers are disposed between said third and fourth layers.

21. A polymer suitable for use in an elastic material, said polymer comprising an A-B-A' triblock copolymer wherein A and A' are the same or different thermoplastic polymer, and wherein B is an elastomeric polymer block, said polymer having a number average molecular weight of from about 65,000 g/mol to about 100,000 glmol; said A and A' being a styrene-based polymer and B is selected from the group consisting of ethylene/propylene and ethylene/butylene.

22. The composite elastic material of claim 21, wherein said elastomeric material comprises about 18% A and A' and about 82% B.

* * * * *